Sept. 3, 1940.    C. PAULSON    2,213,848
COIL TESTING APPARATUS
Filed Dec. 9, 1939
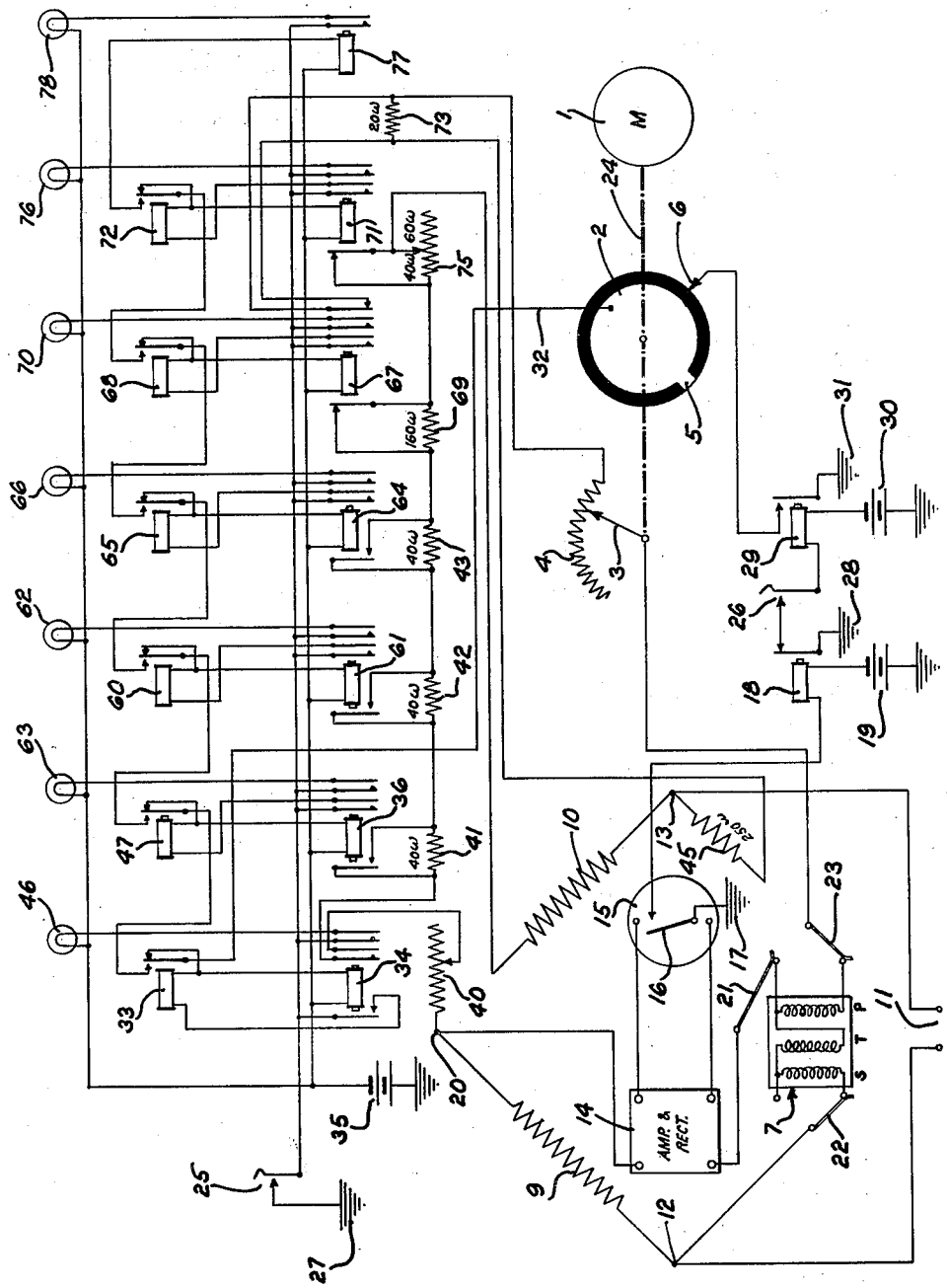
INVENTOR
C. PAULSON
BY Emery Robinson
ATTORNEY Patented Sept. 3, 1940

2,213,848

UNITED STATES PATENT OFFICE 2,213,848

COIL TESTING APPARATUS

Christian Paulson, Elmhurst, Ill., assignor to Western Electric Company, Incorporated, New York, N. Y., a corporation of New York Application December 9, 1939, Serial No. 308,401

10 Claims. (Cl. 175—183)

This invention relates to coil testing apparatus and more particularly to an apparatus for determining the ratio of the number of turns in the primary as compared with the secondary and tertiary windings of induction coils.

It is an object of the present invention to provide a simple apparatus for determining the ratio of the number of turns in the windings of electrical apparatus having a plurality of related windings.

In accordance with one embodiment of the invention as applied to induction coils used in telephone circuits, two of the windings of a coil under test are connected into one arm of a bridge circuit and the third winding thereof is connected to the mutual arm of the bridge circuit, whereupon a motor driven variable resistance automatically and cyclically varies the resistance of the mutual arm of the bridge circuit through a predetermined range and lumped resistance is added step by step to the ratio arm of the bridge circuit each time the motor driven variable resistance moves through its range and fails to balance the bridge. Control circuits are provided whereby the failure of the bridge to balance after all of the resistance has been added into the ratio arm will cause a signal to be actuated and whereby, if the bridge balances at any point during the cycle of the apparatus, further testing will be discontinued and a signal will be given that the windings of the coil under test have the proper ratio with respect one to another.

A better understanding of the invention may be had by reference to the following detailed description of a circuit for checking the ratio of the number of turns in the windings of an induction coil when considered in conjunction with the accompanying drawing, wherein the single figure represents, diagrammatically, a testing circuit made in accordance with the present invention.

Referring to the drawing, wherein an induction coil 7, designed for use in telephone subscribers' sets, is shown to have three windings, the primary winding, secondary winding and tertiary winding being designated P, S and T, respectively. It will be noted that the primary winding P and secondary winding S are wound in the same direction, whereas the tertiary winding T is wound opposite to the primary and secondary windings P and S. In these coils, the ratio of the number of turns in the windings with respect one to another is highly critical and in the test set made in accordance with the present invention the fact that the tertiary winding T is wound in the opposite direction to the primary winding P and secondary winding S is utilized by connecting two opposed windings; for example, the secondary and tertiary windings S and T in one arm of a bridge circuit and comparing them with the other winding, in this case the primary winding P.

An induction coil widely used in telephone subscribers' sets has approximately five hundred turns in its secondary winding, approximately three hundred turns in its tertiary winding and approximately six hundred turns in its primary winding. Since the secondary winding S and tertiary winding T are wound oppositely, these two windings, connected in series, will, in effect, have approximately two hundred turns of effective winding, which should compare with the approximate six hundred turns of the primary winding P as one to three. Accordingly, the opposite arms of the bridge circuit used in testing these coils must also have the ratio of one to three and the standard arm 9, therefore, has a resistance of approximately 1,000 ohms and the ratio arm has a resistance 10 of approximately 3,000 ohms.

It has been found to be desirable to utilize a 900 cycle, 65 volt alternating current for supplying potential to the bridge circuit and, accordingly a 900 cycle A. C. source 11 is provided and is connected to the bridge circuit at the points 12 and 13. Connected across the bridge circuit is a suitable amplifier and rectifier unit 14 having its output connected to a galvanometer type relay 15, which, upon the bridge passing through a condition of balance, will cause its needle 16 to complete a circuit from ground at 17, through the winding of a relay 18, to grounded battery at 19, indicating that the bridge has passed through a condition of balance. One of the input leads of the amplifier and rectifier 14 is connected to the point 20 of the bridge and the other is connected to a suitable contacting device 21, which may be connected to a terminal of the induction coil 7 in any suitable manner, as shown diagrammatically. The point 12 of the bridge circuit may, in a similar manner, be connected to a terminal of the coil 7 under test by the contactor indicated at 22 and the primary winding of the coil 7 under test may be connected into the mutual arm of the bridge circuit by a contacting device 23.

A motor 1 is provided for varying the resistance of the mutual arm of the bridge circuit periodically and is provided with a shaft 24, which drives a contact disc 2 and a contactor arm 3 of a variable resistance 4. The contact disc 2 has a contact 5 thereon, which, once in each rotation of the shaft 24, will engage a brush 6.

When an induction coil 7 is placed in the testing apparatus forming the subject matter of this invention, it is mounted in a suitable fixture and provision is made whereby the coil being placed in the test set will close a pair of contacts 25 and 26. The closure of contacts 25 will place ground at 27 on a lead running to a series of relays, to be described more in detail hereinafter, and closure of contacts 26 will connect ground at 28 over the break contact of relay 18, through the winding of a relay 29, to grounded battery at 30, thereby to energize the relay 29. Relay 29, upon energization, will connect the brush 6 to ground at 31 and, therefore, when the shaft 24 rotates, it will cause ground to be connected through the brush 6, contact 5, over a lead 32, break contact of a relay 33, the winding of a relay 34 to grounded battery at 35, thereby energizing the relay 34, which will close all of its associated contacts and will remain locked to ground at 27 through its left-hand make contacts and the winding of relay 33. Relay 33 will not be energized over the circuit through the contact of relay 34 until contact between contact 5 and brush 6 breaks due to the fact that the winding of relay 33 will have ground connected to both of its ends. As soon as contact 5 and brush 6 are disengaged, relay 33 will pull up in series with relay 34 and transfer lead 32 from association with relay 34 into association with a relay 36, whereby, upon the next engagement of the contact 5 with brush 6, relay 36 will be energized unless relay 29 falls back to disconnect ground at 31 from the brush 6. Relay 29 will fall back when the connection to ground at 28 is broken by the operation of relay 18 due to the bridge circuit having reached a condition of balance. When relay 34 pulls up over the circuit from lead 32, it will connect an adjustable resistance 40 and resistances 41, 42, 43 and 10 in series in the ratio arm of the bridge. As the shaft 24 rotates, it will drive the contactor arm 3 through its cycle to vary the resistance in the mutual arm of the bridge, which includes the primary winding of the induction coil, variable resistance 4 and a resistance 45. As soon as relay 34 operates, it will complete a circuit to a signal lamp 46 to indicate that the induction coil 7 is being tested with the resistances 41, 42, 43 and 10 in the ratio arm of the bridge. If the coil is found to be acceptable with the bridge connected in this manner, no further signal lamps will be lighted.

If the bridge fails to balance with the resistances 41, 42, 43 and 10 connected in series, the circuit to relay 18 will not be completed and the test will continue. The next time the shaft 24 rotates, the ground at 31 will be connected through the brush 6 and lead 32 over the make contact of relay 33, break contact of a relay 47, and through the winding of relay 36 to grounded battery at 35, thereby to energize relay 36 to remove the resistance 41 from the ratio arm of the bridge, whereupon the test cycle of the apparatus will proceed and the variable resistance 4 will be varied throughout its range to determine if the bridge will balance with the resistances 42, 43 and 10 connected in series. As relay 36 was energized, it closed a circuit to signal lamp 63, thereby to give a visual indication that the test is proceeding with the bridge in the condition just described.

If the bridge fails to balance under this condition, the brush 6 and contact 5 will, the next time they engage, complete a circuit over the lead 32 through the make contact of relay 33, make contact of relay 47, break contact of a relay 60, winding of a relay 61 to grounded battery at 35 to energize relay 61, which will pull up and lock over a circuit similar to that described in connection with relay 36. The relay 60 will, of course, also be energized over one of the make contacts of relay 61 and will be locked operated and its condition will be indicated due to the completion of a circuit through a second of its make contacts completing the circuit to a lamp 62.

If the bridge fails to balance with the resistances 43 and 10 in series in the ratio arm of the bridge, the contact 5 and brush 6 will, on the next rotation of the shaft 24, cause the energization of relays 64, to thereby light lamp 66 and indicate that the bridge has failed to balance with the relays 43 and 10 in the ratio arm of the bridge. The next cycle of the shaft 24 will, in a manner similar to that described in connection with the other relays in the chain, cause relays 67 and 68 to be energized. Relay 67, upon energization, will connect a resistance 69 in series with the resistance 10 in the ratio arm of the bridge and the test will proceed with resistances 69 and 10 in the bridge circuit. A lamp 70 will be lighted to show that the test is now being performed with the resistances 69 and 10 in series and if a condition of balance is reached, the relay 18 will be energized and will stop the test, leaving the lights 46, 63, 62, 66 and 70 lighted to indicate that the coil under test is within the prescribed limits and if the bridge fails to balance, the chain of relays will transfer the circuit from lead 32 to relays 71 and 72. It should be noted that the relay 67, upon being operated, completes a circuit to connect a resistance 73 in series with the resistance 45 and variable resistance 4 in the mutual arm of the bridge circuit so that as the test proceeds, the resistances 45, 73 and variable resistance 4 will be included in the mutual arm of the bridge circuit, together with the primary winding P of the coil 7 and that the ratio arm of the bridge will have, as pointed out before, the resistances 10, 160 and a portion of the adjustable resistance 40 connected in it. If the bridge fails to balance under these conditions, relays 71 and 72 will be energized and when relay 71 is energized, it will connect a portion of an adjustable resistance 75 in the ratio arm of the bridge and will close a circuit to light the lamp 76.

If the bridge reaches a condition of balance with resistance 69 and normally shunted portion of the adjustable resistance 75 in the ratio arm of the bridge, the relay 18 will be operated and stop the test.

If the bridge circuit does not balance under any of the hereinbefore described conditions, the coil under test does not have the proper ratio of turns in its windings and the next revolution of the shaft 24 will cause the lead 32 to be connected through the chain of operated relays 33, 47, 60, 65, 68 and 72 to the winding of a relay 77. Energization of the relay 77 will close its contacts and complete a circuit to signal lamp 78, indicating that the coil under test does not fall within the selected limits and the operator will thus be informed that the coil is defective and may then proceed to discard it and place another coil in the test set.

From the foregoing, it will be apparent that the ratio of the number of turns in an induction coil being tested may be determined with a relatively high degree of accuracy, depending upon which of the signal lamps are lighted when the coil is accepted and the bridge circuit balances to stop the test.

It will be noted that the resistances 41, 42 and 43 are connected in series at the beginning of the test and that, therefore, the ratio arm of the bridge has 120 ohms resistance in addition to the resistance 10 and that the resistances 41, 42 and 43 are cut out of the ratio arm of the bridge one at a time so that the resistance of the ratio arm is reduced in increments of 40 ohms from the value of the resistance 10 plus 120 ohms down to the value of the resistance 10 alone and that thereafter the resistance 11 is connected in the ratio arm and that this resistance is a 160 ohm resistance so that the test proceeds from a mean value, thereby to eliminate as much testing time as possible.

Although a specific embodiment of the invention has been described hereinbefore, it will be understood that modifications may be made thereof without departing from the scope of the invention, which is to be limited only by the appended claims.

What is claimed is:

1. Coil testing apparatus comprising a bridge circuit having a standard arm, a mutual arm, a ratio arm and an unknown arm, means for connecting a winding of a coil under test in the unknown arm, means for connecting a second winding of the coil under test in the mutual arm, means for changing the value of the mutual arm repeatedly through a fixed range, and means for varying the value of the ratio arm in increments every time the mutual arm is varied through its range.

2. Apparatus for determining whether multi-wound coils have the proper ratio of turns in their windings comprising an alternating current bridge circuit having a ratio arm and a mutual arm, means for connecting one winding of a coil to be tested in the mutual arm of the bridge circuit, means for connecting another winding of the coil to be tested in the unknown arm of the bridge circuit, a chain of relays operable under control of the bridge circuit for changing the value of the ratio arm of the bridge circuit by increments, and means for varying the mutual arm of the bridge circuit through a fixed range each time the ratio arm is changed.

3. An automatic testing circuit comprising a bridge having a standard arm, an unknown arm, a mutual arm and a ratio arm, means for connecting windings of a coil to be tested in the unknown arm and mutual arm of the bridge circuit, means for changing the value of the ratio arm of the bridge circuit in increments, said last mentioned means being operable to arrange the ratio arm at its mean value and reduce said value by said increments to the minimum and thereafter arrange the ratio arm at a value one increment above the mean and increase said value by increments, and means for varying the mutual arm through a fixed range each time an increment is added to or taken from the ratio arm.

4. An automatic testing circuit comprising a bridge having a standard arm, an unknown arm, a mutual arm and a ratio arm, means for connecting windings of a coil to be tested in the unknown arm and mutual arm of the bridge circuit, means for changing the value of the ratio arm of the bridge circuit in increments, said last mentioned means being operable to arrange the ratio arm at its mean value and reduce said value by said increments to the minimum and thereafter arrange the ratio arm at a value one increment above the mean and increase said value by increments, means for varying the mutual arm through a fixed range each time an increment is added to or taken from the ratio arm, and means associated with the means for changing the ratio arm to indicate the changes effected in the ratio arm.

5. An automatic testing circuit comprising a bridge having a standard arm, an unknown arm, a mutual arm and a ratio arm, means for connecting windings of a coil to be tested in the unknown arm and mutual arm of the bridge circuit, means for changing the value of the ratio arm of the bridge circuit in increments, said last mentioned means being operable to arrange the ratio arm at its mean value and reduce said value by said increments to the minimum and thereafter arrange the ratio arm at a value one increment above the mean and increase said value by increments, means for varying the mutual arm through a fixed range each time an increment is added to or taken from the ratio arm, and means for interrupting the operation of the means for changing the ratio arm whenever the bridge circuit balances.

6. Coil testing apparatus comprising a bridge circuit having a standard arm, a mutual arm, a ratio arm and an unknown arm, means for connecting a winding of a coil under test in the unknown arm, means for connecting a second winding of the coil under test in the mutual arm, means for changing the value of the mutual arm repeatedly through a fixed range, means for varying the value of the ratio arm in increments every time the mutual arm is varied through its range, and means under control of the bridge circuit for interrupting the operation of the means for varying the value of the ratio arm.

7. Coil testing apparatus comprising a bridge circuit having a standard arm, a mutual arm, a ratio arm and an unknown arm, means for connecting a winding of a coil under test in the unknown arm, means for connecting a second winding of the coil under test in the mutual arm, means for changing the value of the mutual arm repeatedly through a fixed range, means for varying the value of the ratio arm in increments every time the mutual arm is varied through its range, said last mentioned means comprising a chain relay circuit, and means associated with the means for changing the value of the mutual arm to operate said relays seriatim.

8. Apparatus for determining whether induction coils have the proper ratio of turns in their windings comprising a bridge circuit, means for connecting a winding of a coil under test in one arm of said bridge circuit, a variable resistance in another arm of the bridge circuit, means for connecting another winding of said coil in the second mentioned arm of the bridge circuit, means for repeatedly actuating said variable arm of the bridge circuit throughout its range, and means for changing the value of a third arm of the bridge circuit by fixed amounts each time the variable resistance goes through its range.

9. Apparatus for determining whether induction coils have the proper ratio of turns in their windings comprising a bridge circuit, means for connecting two oppositely wound windings of a coil under test in series in one arm of said bridge circuit, a variable resistance in another arm of the bridge circuit, means for connecting another winding of said coil in the second mentioned arm of the bridge circuit, means for repeatedly actuating said variable arm of the bridge circuit throughout its range, and means for changing the value of a third arm of the bridge circuit by fixed amounts each time the variable resistance goes through its range.

10. Apparatus for determining whether multi-wound coils have the proper ratio of turns in their windings comprising an alternating current bridge circuit having a ratio arm and a mutual arm, means for connecting one winding of a coil to be tested in the mutual arm of the bridge circuit, means for connecting another winding of the coil to be tested in the unknown arm of the bridge circuit, a chain of relays operable under control of the bridge circuit for changing the value of the ratio arm of the bridge circuit by increments, means for varying the mutual arm of the bridge circuit through a fixed range each time the ratio arm is changed, and an impulse emitter driven synchronously with the last mentioned means for emitting an impulse to actuate relays in said chain.

CHRISTIAN PAULSON.